United States Patent
Towal et al.

(10) Patent No.: US 11,238,346 B2
(45) Date of Patent: Feb. 1, 2022

(54) LEARNING A TRUNCATION RANK OF SINGULAR VALUE DECOMPOSED MATRICES REPRESENTING WEIGHT TENSORS IN NEURAL NETWORKS

(71) Applicant: QUALCOMM Incorporated, San Diego, CA (US)

(72) Inventors: Regan Blythe Towal, San Diego, CA (US); Raghuraman Krishnamoorthi, Cupertino, CA (US)

(73) Assignee: Qualcomm Incorproated, San Diego, CA (US)

( * ) Notice: Subject to any disclaimer, the term of this patent is extended or adjusted under 35 U.S.C. 154(b) by 936 days.

(21) Appl. No.: 15/962,996

(22) Filed: Apr. 25, 2018

(65) Prior Publication Data

US 2019/0332941 A1    Oct. 31, 2019

(51) Int. Cl.
| | | |
|---|---|---|
| H04L 12/24 | (2006.01) | |
| G06Q 10/04 | (2012.01) | |
| G06N 3/08 | (2006.01) | |
| G06N 3/04 | (2006.01) | |
| G06N 3/063 | (2006.01) | |

(52) U.S. Cl.
CPC .............. *G06N 3/084* (2013.01); *G06N 3/04* (2013.01); *G06N 3/063* (2013.01)

(58) Field of Classification Search
CPC ........... G06N 3/084; G06N 3/04; G06N 3/063
USPC ....................................................... 706/1–62
See application file for complete search history.

(56) References Cited

U.S. PATENT DOCUMENTS

| | | | |
|---|---|---|---|
| 11,080,336 B2* | 8/2021 | Van Dusen | ........ G06Q 30/0201 |
| 2002/0083041 A1 | 6/2002 | Achlioptas et al. | |
| 2011/0026849 A1 | 2/2011 | Kameyama | |
| 2013/0339919 A1* | 12/2013 | Baseman | ............... G06Q 10/04 |
| | | | 716/136 |
| 2014/0031969 A1* | 1/2014 | Baseman | ......... G05B 19/41875 |
| | | | 700/121 |
| 2014/0079297 A1 | 3/2014 | Tadayon et al. | |
| 2016/0217369 A1 | 7/2016 | Annapureddy et al. | |
| 2017/0011280 A1 | 1/2017 | Soldevila et al. | |

FOREIGN PATENT DOCUMENTS

| | | |
|---|---|---|
| CN | 106326985 A | 1/2017 |
| WO | 2016010930 A1 | 1/2016 |

OTHER PUBLICATIONS

Astrid M., et al., (Jan. 25, 2017) "CP-decomposition with Tensor Power Method for Convolutional Neural Networks Compression" Retrived from https://ieeexplore.ieee.org/document/7881725 (Year: 2017).*

(Continued)

*Primary Examiner* — Brandon S Cole
(74) *Attorney, Agent, or Firm* — Arent Fox LLP

(57) ABSTRACT

An apparatus for learning a rank of an artificial neural network is configured to decompose a weight tensor into a first weight tensor and a second weight tensor. A set of rank selection parameters are applied to the first weight tensor and the second weight tensor to truncate the rank of the first weight tensor and the second weight tensor. The set of rank selection parameters are updated simultaneously with the weight tensors by averaging updates calculated for each rank selection parameter of the set of rank selection parameters.

29 Claims, 10 Drawing Sheets

(56) References Cited

OTHER PUBLICATIONS

Ng Andrew (2015) "Sparse autoencoder" Retrived from https://web.stanford.edu/class/cs294a/sparseAutoencoder_2011new.pdf (Year: 2015).*

Allen I., (2008) "Bitwise Operations, bit masking" Retrieved from http://teaching.idallen.com/cst8214/08w/notes/bit_operations.txt (Year: 2008).*

Denton E., et al., (2014) "Exploiting Linear Structure Within Convolutional Networks for Efficient Evaluation" Retrieved from https://arxiv.org/abs/1404.0736 (Year: 2014).*

Alvarez J.M., et al., "Compression-Aware Training of Deep Networks", arxiv.org, Cornell University Library, 201 Olin Library Cornell University Ithaca, NY 14853, Nov. 7, 2017 (Nov. 7, 2017), XP080835243, 12 Pages, abstract, p. 1, line 1-p. 5, last line.

Astrid M., "Deep Compression of Convolutional Neural Networks with Low-Rank Approximation", Aug. 1, 2017 (Aug. 1, 2017), XP055604845, 123 Pages, Retrieved from the Internet: URL:https://www.researchgate.net/profile/Marcella_Astrid/publication/319623885_Deep_Compression_of_Convo . . . [retrieved on Jul. 11, 2019], abstract, section 4.1, section 4.2, section 4.3, section 4.4.

Chong L., et al., "Constrained Optimization Based Low-Rank Approximation of Deep Neural Networks", Oct. 6, 2018 (Oct. 6, 2018), International Conference on Computer Analysis of Images and Patterns, CAIP 2017: Computer Analysis of Images and Patterns; [Lecture Notes In Computer Science; Lect.Notes Computer], Springer, Berlin, Heidelberg, pp. 746-761, XP047488366, ISBN: 978-3-642-17318-9, [retrieved on Oct. 6, 2018] abstract, p. 747, line 15-p. 752, last line.

International Search Report and Written Opinion—PCT/US2019/028361—ISA/EPO—dated Jul. 25, 2019.

Kim Y-D., et al., "Compression of Deep Convolutional Neural Networks for Fast and Low Power Mobile Applications", Feb. 24, 2016 (Feb. 24, 2016), XP055396146, 16 Pages, Retrieved from the Internet: URL:http://arxiv.org/pdf/1511.06530v2.pdf [retrieved on Aug. 4, 2017] Abstract, p. 2, line 6-line 25, p. 3, line 7-p. 6, last line.

Nakkiran P., et al., "Compressing Deep Neural Networks using a Rank-Consliained Topology", Jan. 1, 2015 (Jan. 1, 2015), pp. 1473-1477, XP055604868, Retrieved from the Internet: URL:https://static.googleusercontent.com/media/research.google.com/en//pubs/archive/43813.pdf [retrieved on Jul. 11, 2019], abstract; figures 1-3, section 2.

Xiyu Y., et al., "On Compressing Deep Models by Low Rank and Sparse Decomposition", IEEE Computer Society Conference On Computer Vision And Pattern Recognition. Proceedings, IEEE Computer Society, US, Jul. 21, 2017 (Jul. 21, 2017), pp. 67-76, XP033249341, ISSN: 1063-6919, DOI: 10.1109/CVPR.2017.15 [Retrieved on Nov. 6, 2017], abstract, p. 69, right-hand column, line 1-p. 72, left-hand column, last line.

Xue J., et al., "Restructuring of Deep Neural Network Acoustic Models with Singular Value Decomposition", Proc. Interspeech 2013, Aug. 25, 2013 (Aug. 25, 2013), pp. 2365-2369, XP055193450, Lyon, France, Retrieved from the Internet: URL:http://www.isca-speech.org/archive/archive_papers/interspeech_2013/i13_2365.pdf [retrieved on Jun. 3, 2015], abstract, section 2, section 3.

* cited by examiner

LEARNING A TRUNCATION RANK OF SINGULAR VALUE DECOMPOSED MATRICES REPRESENTING WEIGHT TENSORS IN NEURAL NETWORKS

BACKGROUND

Field

Certain aspects of the present disclosure generally relate to machine learning and, more particularly, to improving systems and methods of learning a truncation rank of singular value decomposed matrices representing weight tensors in neural networks.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. Such multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Deep neural networks may be trained with many more parameters than needed to solve a certain task to provide convergence and reduce over-fitting. Such a training procedure may be used to explore large error surfaces associated with many tasks. However, at the end of training, the networks may be over-parameterized. The network size may be reduced by applying compression techniques. One such technique is to perform dimensionality reduction by decomposing the weight tensors in each layer using singular value decomposition (SVD). Each weight tensor is a 2- or 4-dimensional tensor and by applying SVD, each tensor can be divided into two 2-dimensional tensors. If the full rank SVD is used, this will inflate the computational cost of the layer. However, if the rank is truncated to keep only the top-N most significant ranks (highest N singular values), then the computational cost of the layer may be reduced compared to the initial, combined tensor. Unfortunately, finding N, the rank at which to truncate the decomposed matrices and still maintain the original performance of the deep neural network is difficult to determine. Thus there is a need for techniques to find the rank N.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The features, which are believed to be characteristic of the disclosure, both as to its organization and method of operation will be better understood from the following description when considered in connection with the accompanying figures. It is to be expressly understood, however, that each of the figures is provided for the purpose of illustration and description only and is not intended as a definition of the limits of the present disclosure.

Artificial neural networks such as deep convolutional networks may be useful for image classification. However, such networks may be computationally complex and consume significant compute resources.

To address the issue of computational complexity and compute resource consumption, a truncation rank of singular value decomposed matrices representing weight tensors in the network may be learned to reduce the size of the network.

In an aspect of the disclosure, a method, a computer readable medium, and apparatus for learning a rank of an artificial neural network are presented. The apparatus includes a memory and at least one processor coupled to the memory. The processor(s) are configured to decompose a weight tensor into a first weight tensor and a second weight tensor. The processor(s) are also configured to apply a set of rank selection parameters to the first weight tensor and the second weight tensor to truncate the rank of the first weight tensor and the second weight tensor. Further, the processor(s) are configured to update the set of rank selection parameters by averaging updates calculated for each rank selection parameter of the set of rank selection parameters.

Additional features and potential advantages of aspects of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The features will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
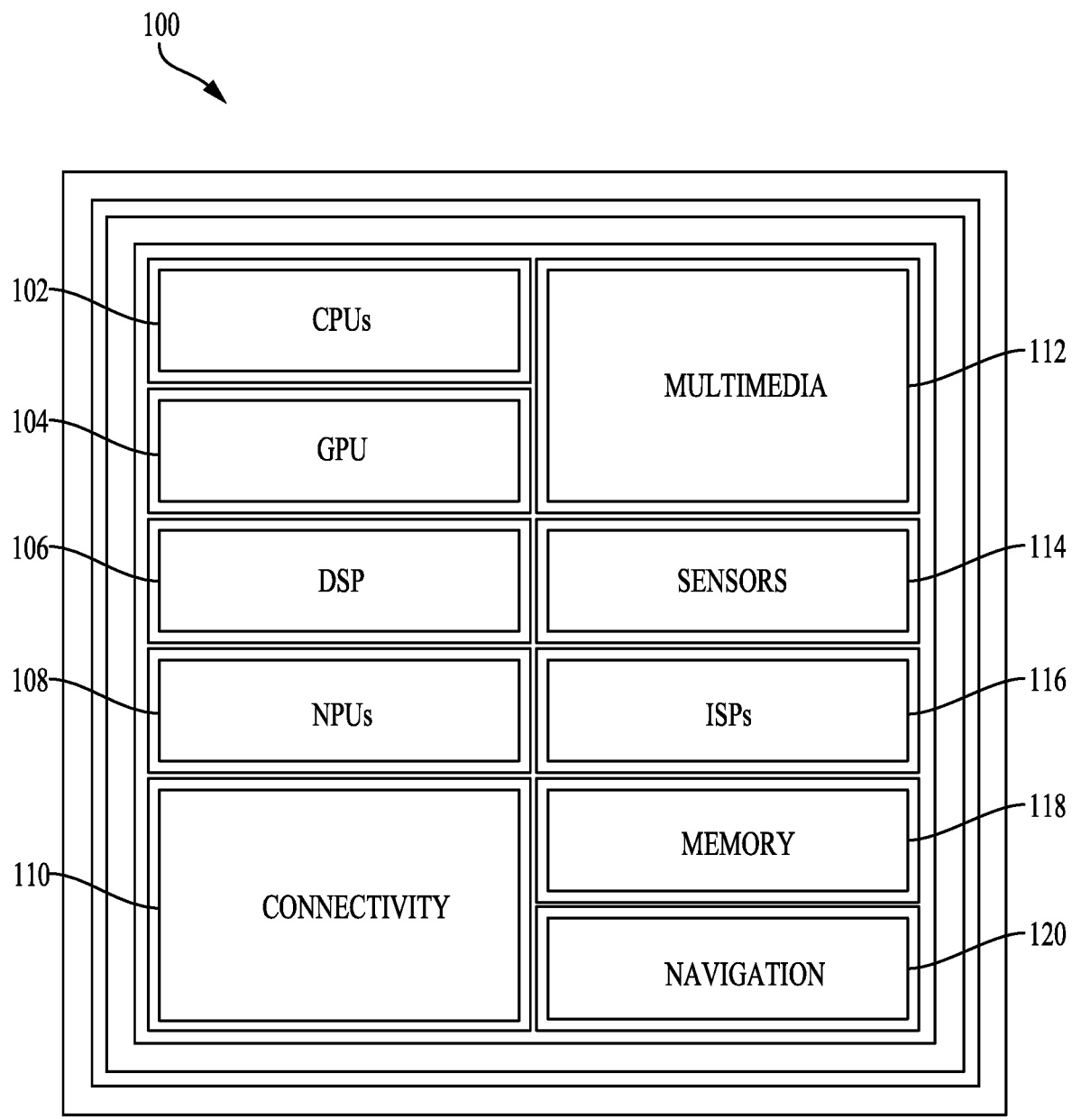
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without the specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of the particular aspects fall within the scope of the disclosure. Although some benefits and advantages of aspects of the disclosure are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of such aspects. The detailed description and drawings are merely illustrative of the disclosure rather than limiting, with the scope of the disclosure being defined by the appended claims and equivalents thereof.

Learning Truncation Rank of SVD Matrices Representing Weight Tensors in Neural Networks Aspects of the present disclosure are directed to learning a truncation rank of a singular value decomposed matrix. The rank of a matrix is the number of linearly independent rows or columns (e.g., the number of non-zero rows or columns) of the matrix. A truncation rank is a rank approximation of the rank of the matrix. The truncation rank may be learned by learning the offset of a set of bounded parameters that are initialized to be monotonically decreasing in order of singular value magnitude. In other words, the rank of the weight tensors may be truncated by learning to set a set of parameters $\beta$ (which may be referred to as rank selection parameters) to 0 for successively higher singular values.

In accordance with aspects of the present disclosure, a weight tensor of a neural network may be decomposed into a first weight tensor and a second weight tensor via singular value decomposition (SVD). A filter having a rank selection parameters $\beta$ may be applied to the first weight tensor and the second weight tensor.

The rank selection parameters may comprise real values and may be initialized to a random value. In some aspects, the rank selection parameters may be initialized to a linear function of a rank number between 0.5 and 1. The rank selection parameters may be applied to the weight tensors to generate an output as given by:

$$y_p = \beta_i x_p, \tag{1}$$

where $x_p$ is the filter input (weights of the weight tensors) and $y_p$ is the filter output.

In some aspects, the rank selection parameter may be regularized in a forward pass of the network (e.g., when computing an inference). That is, a threshold may be applied to each rank selection parameter $\beta_i$. The actual value of each rank selection parameter $\beta_i$ may be compared to the threshold. For example, the rank selection parameter may be regularized:

$$y_p = \begin{cases} x_p, & \hat{\beta}_i \geq 0.5 \\ 0, & \hat{\beta}_i < 0.5 \end{cases} \tag{2}$$

where $\hat{\beta}_i$ is the actual value of the rank selection parameter with $\beta_i$ being the applied value of the rank selection parameter.

If the actual value of a rank selection parameter $\hat{\beta}_i$ is less than the threshold (e.g., 0.5), then an applied value of the rank selection parameter $\beta_i$ may be set to 0 such that the filter may be removed. On the other hand, if the actual value of a rank selection parameter $\hat{\beta}_i$ is greater than or equal to the threshold (e.g., 0.5) then the applied value of the rank selection parameter $\beta_i$ may be set to 1 such that the filter remains.

During a backward pass of the network (e.g., fine tuning via back propagation), each of the rank selection parameters may be updated. For example, each of the rank selection parameters may be updated by the average of the updates calculated for each parameter in the set. Accordingly, the same update may be applied to all of the rank selection parameters in the set of parameters. By applying the same update (e.g., average of updates for all rank selection parameters), the rank selection parameters may be configured to move in concert relative to the static threshold.

Additionally, by updating all rank selection parameters using the same update (e.g., offset) a dependency may be enforced among the rank selection parameters such that the first N rank selection parameters may be 1 and the remaining M-N rank selection parameters may be 0. Accordingly, the top-N singular value dimensions may be retained. Because this method may employ standard back propagation to update the rank selection parameters, learning the rank selection parameters may be combined with fine-tuning or updating the weights to achieve smaller models. That is, in some aspects, the truncation rank of singular value decomposed weight tensors may be learned while simultaneously fine-tuning the weight values to reduce the model size. For instance, in the rank selection may be updated in the backward pass of the network in accordance with the following:

$$\frac{\delta y_p}{\delta x_p} = \begin{cases} 1, & \overline{\beta}_t \geq 0.5 \\ 0, & \overline{\beta}_t < 0.5 \end{cases} \quad (3)$$

$$\frac{\delta y_p}{\delta \overline{\beta}_t} = x_p \quad (4)$$

FIG. 1 illustrates an example implementation of the method of learning a rank of an artificial neural network using a system-on-a-chip (SOC) 100, which may include a general-purpose processor (CPU) and/or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a Neural Processing Unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation 120, which may include a global positioning system.

The SOC 100 may be based on an ARM instruction set. In an aspect of the present disclosure, the instructions loaded into the general-purpose processor 102 may comprise code for decomposing a weight tensor into a first weight tensor and a second weight tensor. The instructions loaded into the general-purpose processor 102 may also comprise code for applying a set of rank selection parameters to the first weight tensor and the second weight tensor to truncate the rank of the first weight tensor and the second weight tensor. The instructions loaded into the general-purpose processor 102 may further comprise code for updating the set of rank selection parameters by averaging updates calculated for each rank selection parameter of the set of rank selection parameters.

Figure 2:
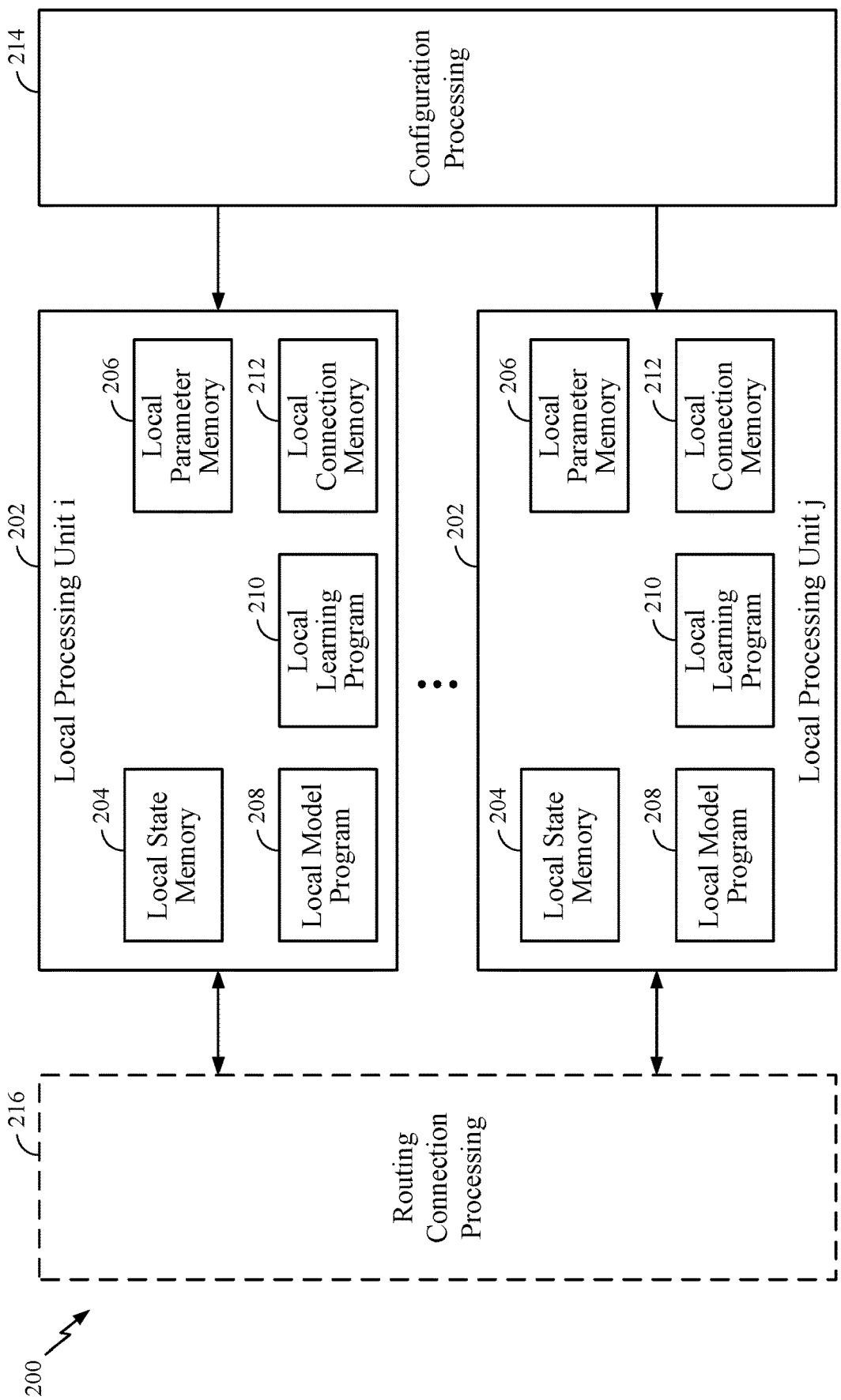
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to human engineered features learned through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. Such features may be combined at higher layers in different ways to recognize cars, trucks, and airplanes.

Neural networks may be designed with a variety of connectivity patterns. In feed-forward networks, information is passed from lower to higher layers, with each neuron in a given layer communicating with neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
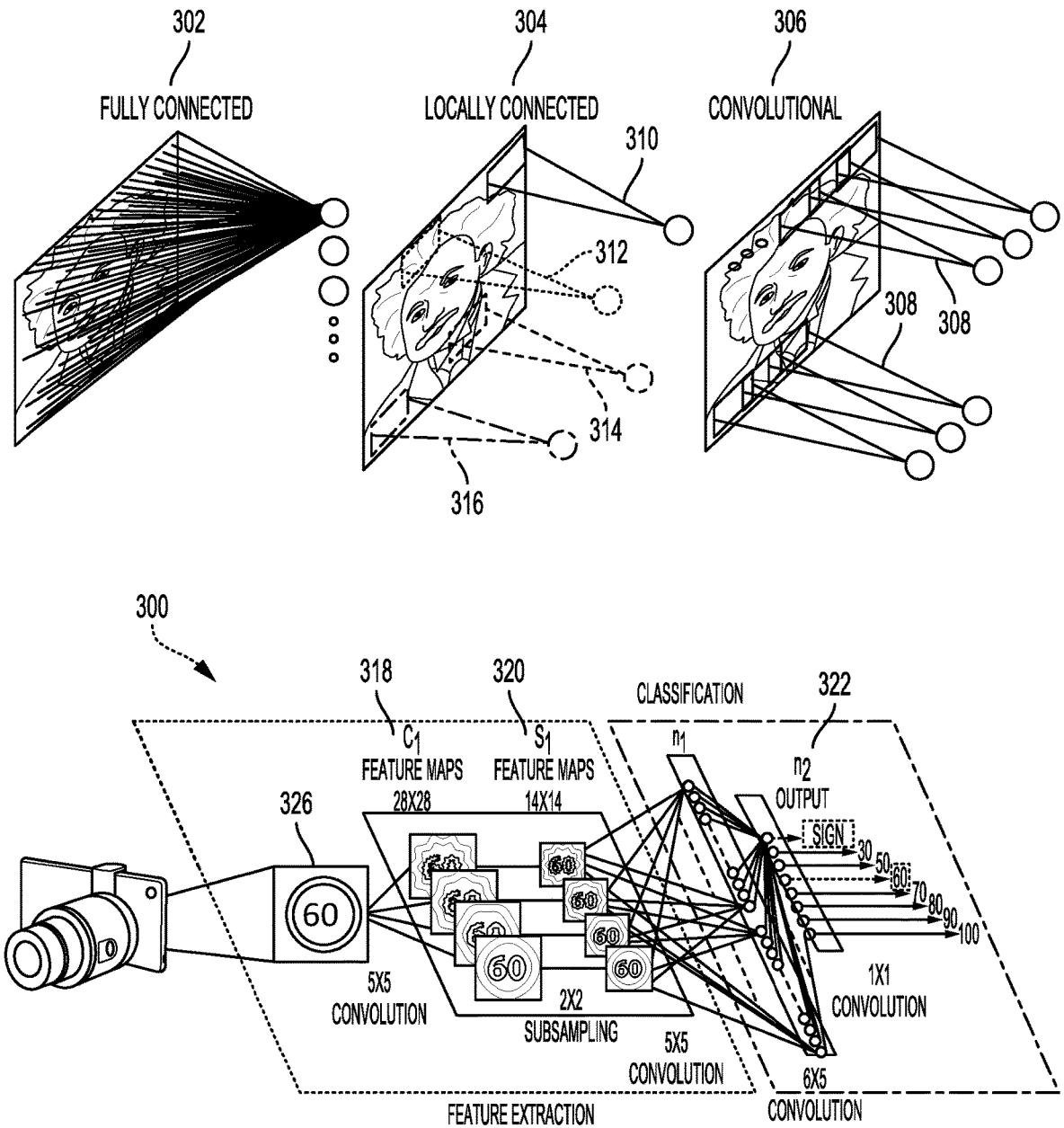
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate that neuron's output to every neuron in a second layer, so that each neuron in the second layer receives input from every neuron in the first layer. Alternatively, in a locally connected network 304, a neuron in a first layer may be connected to a limited number of neurons in the second layer. A convolutional network 306 may be locally connected, and may be further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as a "backward pass" through the neural network is involved during the weight adjustments.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on the input may be considered three-dimensional, with two spatial dimensions along the axes [e.g., x and y axes] of the image and a third dimension capturing color information [e.g., the z axis]. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
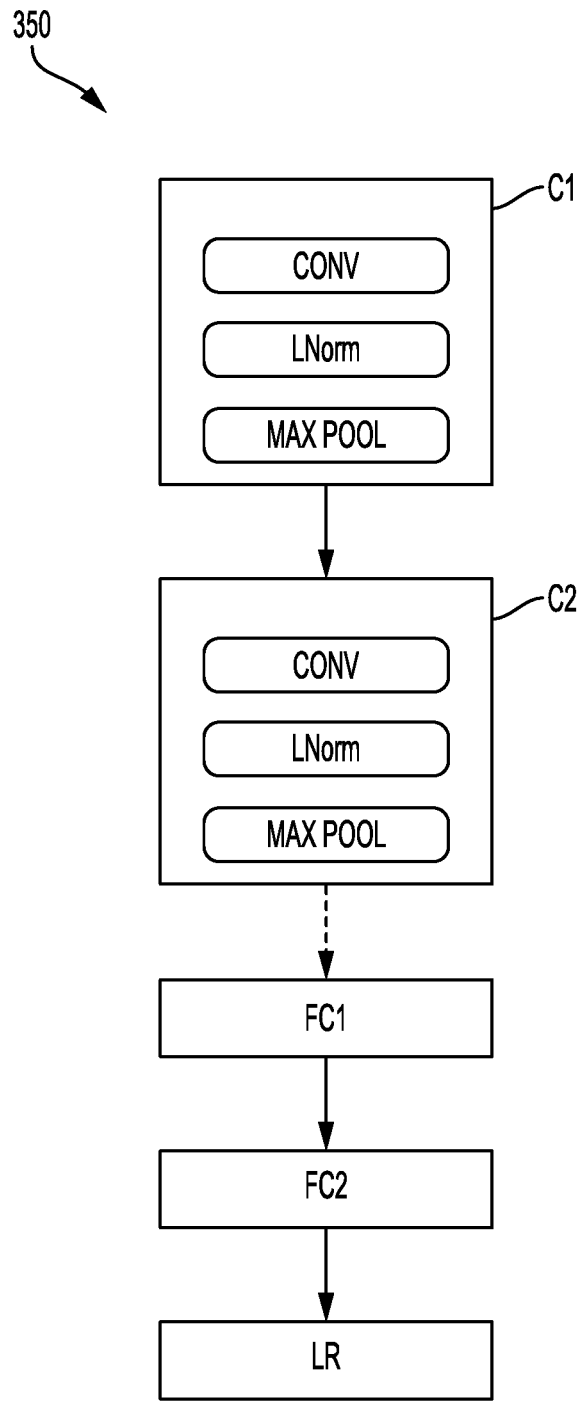
FIG. 3B is a block diagram illustrating an exemplary deep convolutional network (DCM) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4A:
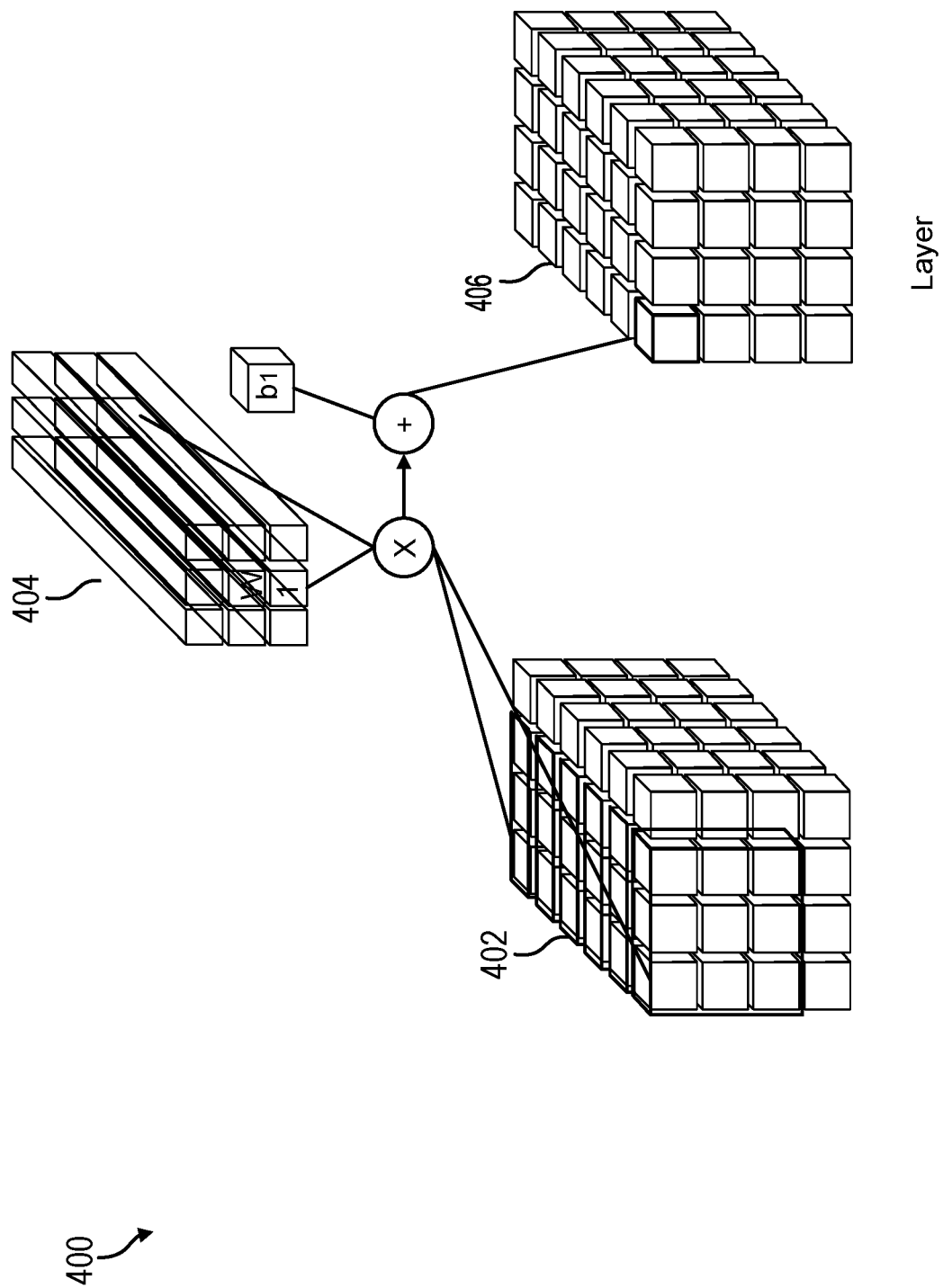
FIGS. 4A-C are block diagrams illustrating learning a rank of an exemplary artificial neural network in accordance with aspects of the present disclosure.
Figure 4B:
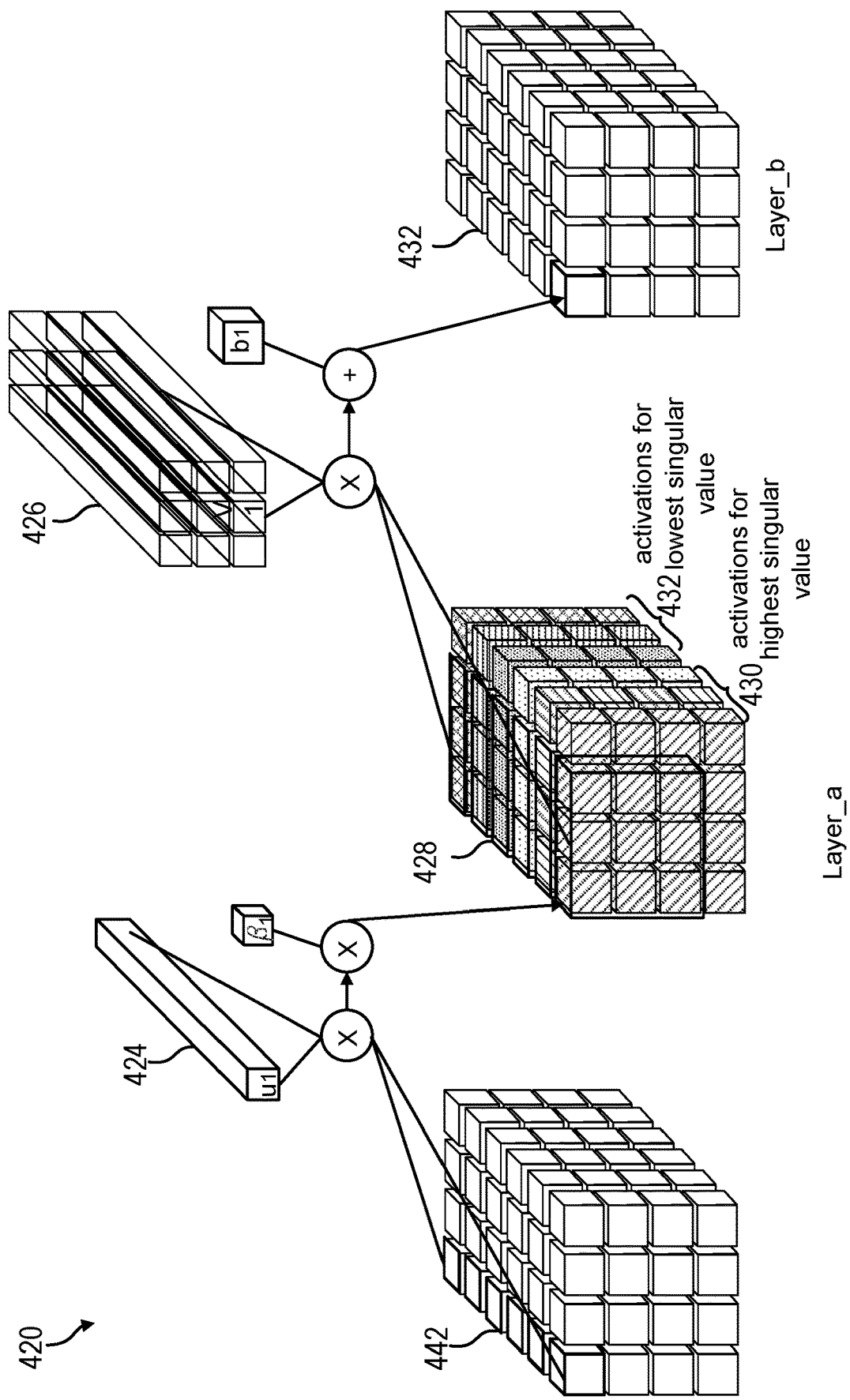
Figure 4C:
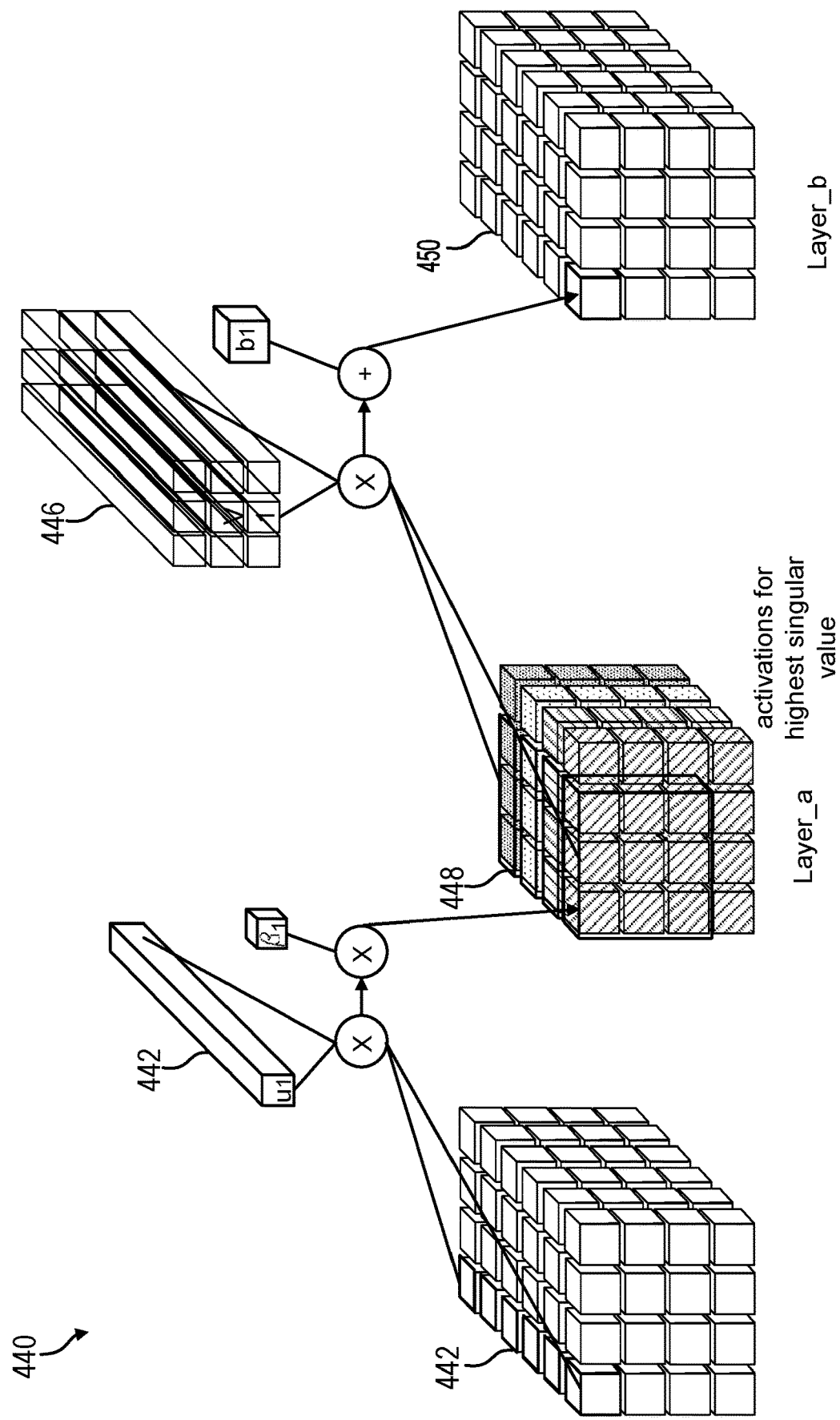

FIGS. 4A-C are block diagrams illustrating learning a rank of an exemplary artificial neural network in accordance with aspects of the present disclosure. Referring to FIG. 4A, a layer of the artificial neural network 400. The artificial neural network includes a layer 406 including a set of nodes. In the artificial neural network 400, a set of inputs 402 are received at a layer of the artificial neural network 400. The set of inputs 402 are convolved with a set of weights of weight tensor 404. A bias term $b_1$ may be added to the result of the convolution and the sum may be output and supplied as an input for the next layer 406 of the artificial neural network 400.

Singular value decomposition (SVD) may be applied to weights 404. Applying SVD, weight tensor 404 may be represented by two matrices (e.g., 424, 426) as given by $W \approx \hat{W} = UV^T$, where U is an M×M matrix of input filters, and V is a M×N matrix of output filters, each of which has a rank=M. As such, weight tensor 404 of artificial neural network 400 may be decomposed into a first weight tensor $U_1$ 424 and a second weight tensor $V_1$ 426. A filter having a rank selection parameters $\beta_1$ may be inserted for each output 428. The rank selection parameter $\beta_1$ may be initialized with a designated value (e.g., 0.5). Accordingly, input filter $U_1$ may be convolved with the inputs 422 to produce filtered inputs. The rank selection parameter may be applied to the filtered input to produce a set of activations of Layer_a 428. The activations of Layer_a may be arranged according to singular value with the activations for the greatest singular values (e.g., 430) are ordered before the activations for the lowest singular values (e.g., 432). The output filters $V_1$ 426 may then be applied to the activations of Layer_a 428 to produce a filtered output. A bias term $b_1$ may be added to the filtered output, the sum of which may be output and supplied to a next layer (Layer_b 434).

In accordance with aspects of the present disclosure, a learning technique such as backpropagation, for instance, may be used to set rank selection parameter $\beta_i$ to zero for successively greater singular values. In so doing, applying the rank selection parameter $\beta_i$ may result in some of the lower singular activations (e.g., 432) of Layer_a 428 having a value of zero. Using SVD, the activation function may be linear between layers and the rank selection parameters may monotonically decreasing. Thus, fewer computations may be performed in applying the output filter $V_1$ 426 to calculate the output (e.g., Layer_b 434).

Referring to FIG. 4C, the rank selection parameter has been applied to artificial neural network 440. A set of the lowest singular value activations (e.g., see 432 of FIG. 4B) of Layer_a 448 may have a value of zero and may be removed. Accordingly, the input filters $U_1$ 444 may be applied to the inputs 442. The rank selection parameter $\beta_i$ may be applied to the filtered inputs. However, because the rank selection parameter $\beta_i$ may be zero for the lowest singular value, a set of the lowest singular value activations may in turn be zero and may be removed. Thus, the rank of the activations may be reduced, thereby reducing the computations (e.g., fewer multiplication and addition operations may be performed in the convolution of the activations and the output filters $V_1$ 446) to produce the outputs of Layer_b 450.

Figure 5:
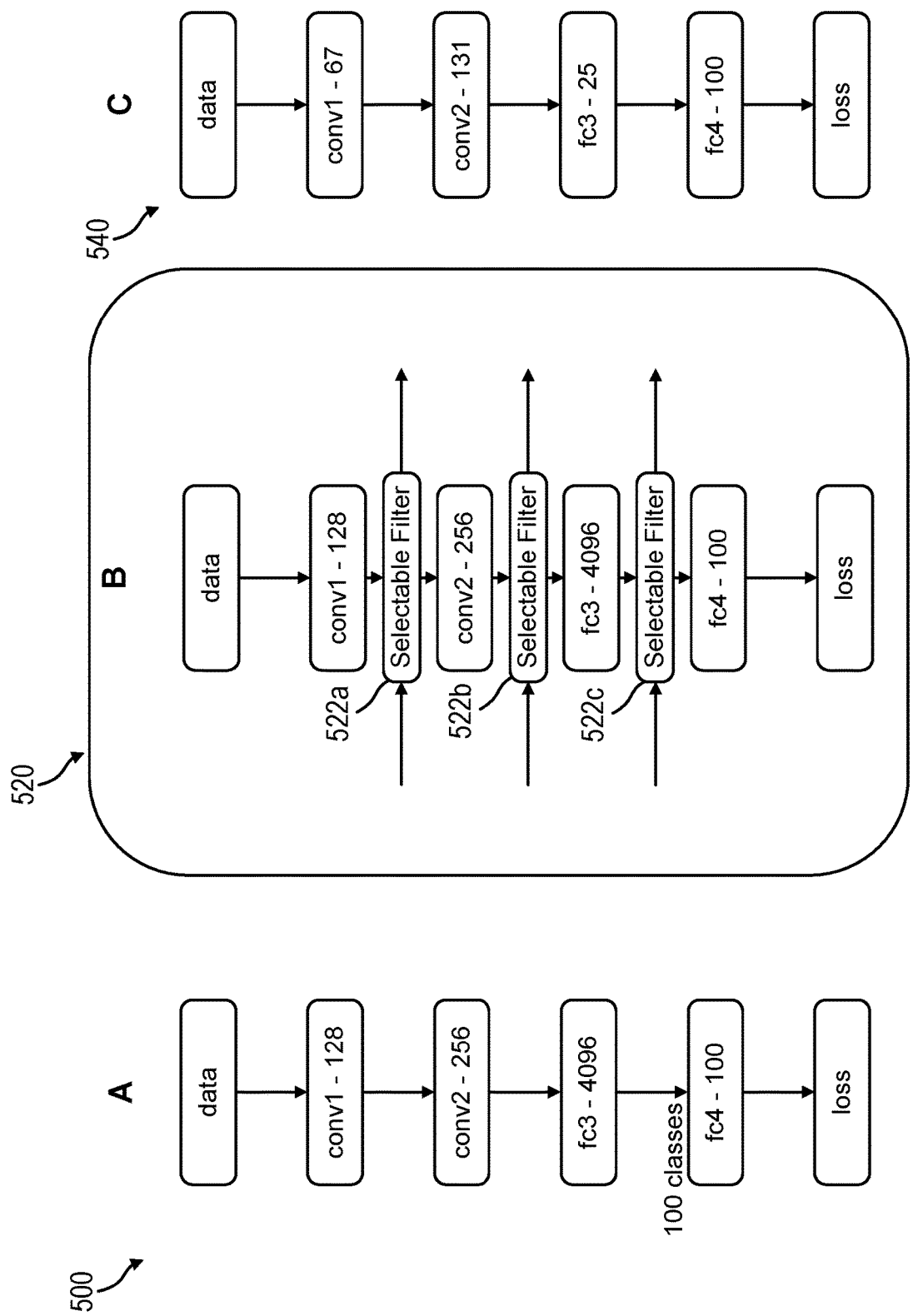
FIG. 5 is a block diagram illustrating the updating of an exemplary artificial neural network in accordance with aspects of the present disclosure.

FIG. 5 is a block diagram illustrating the updating of an exemplary artificial neural network in accordance with aspects of the present disclosure. Referring to FIG. 5, the exemplary artificial neural network 500 at a stage A may include a data input layer, convolutional layers (conv1, conv2), fully connected layers (fc3 and fc4) and a loss layer (e.g., a soft max layer). In the exemplary artificial neural network 500, the convolutional layer conv1 may have 128 parameters, convolutional layer conv2 may have 256 parameters and fully connected layer fc3 may have 4096 parameters, all of which may be used to identify a class among 100 classes in fully connected layer fc4.

In accordance with aspects of the present disclosure, SVD may be applied to artificial neural network 500. As shown in stage B, selectable filters 522a, 522b and 522c may be inserted respectively for outputs of the convolutional layer conv1, convolutional layer conv2 and fully connected layer fc3. In some aspects, the selectable filters (e.g., 522a, 522b, and 522c) may each comprise a tri-state rectifier linear unit, for example. Each of the selectable filters (e.g., 522a, 522b, and 522c) may have a rank selection parameter $\beta_i$. The rank selection parameters $\beta_i$ may be initialized with a designated value (e.g., 1). The rank selection parameters $\beta_i$ may have real values and may be initialized to a randomly determined value (e.g., using a pseudo random number generator). In some aspects, the rank selection parameters may be initialized to a linear function of a rank number between 0.5 and 1. The rank selection parameters $\beta_i$ may be applied to the weight tensors of a layer (e.g., conv1) to generate an output as indicated above in equation 1.

In some aspects, the rank selection parameter $\beta_i$ for each of the selectable filters may be regularized in a forward pass of the network (e.g., when computing an inference or a classification). That is, a threshold may be applied to each rank selection parameter $\beta_i$. The actual value of each rank selection parameter $\beta_i$ may be compared to the threshold (e.g., 0.5). In one example, the where the rank selection parameter $\beta_i$ is less than 0.5, the selectable filter may apply a zero such that an output to which the selectable filter is applied may be removed and where the rank selection parameter $\beta_i$ is greater than or equal to 0.5, the selectable filter may apply a one such that an output to which the selectable filter is applied may be passed to a subsequent layer. In turn, an inference may be determined and output via fully connected layer fc4. The output may be supplied to a loss layer to compute an error.

During a backward pass of the network (e.g., fine tuning via back propagation), each of the rank selection parameters $\beta_i$ of selectable filters 522a, 522b, and 522c may be updated. For example, a gradient may be determined for each of the rank selection parameters $\beta_i$. An average of the gradients may be calculated and used to determine an update for all of the rank selection parameters $\beta_i$. That is, the same update may be applied to all of the rank selection parameters $\beta_i$ of selectable filters 522a, 522b, and 522c. By applying the same update (e.g., average of updates for all rank selection parameters), the rank selection parameters may be configured to move in concert relative to the static threshold.

Additionally, by updating all rank selection parameters using the same update (e.g., offset) a dependency may be enforced among the rank selection parameters $\beta_i$ such that the first N rank selection parameters may be 1 and the remaining M–N rank selection parameters may be 0. Accordingly, the top-N singular value dimensions may be retained. Because standard back propagation may be used to update the rank selection parameters $\beta_i$, learning the rank selection parameters $\beta_i$ may be combined with fine-tuning or updating the weights of each layer of the artificial network 520 to achieve smaller models. That is, in some aspects, the truncation rank of singular value decomposed weight tensors may be learned while simultaneously fine-tuning the weight values to reduce the model size.

In some aspects, the ranks selection parameter $\beta_i$ updated or fine-tuned based on a performance metric of the artificial neural network 520. For example, the performance metric may include processing speed, memory size, memory bandwidth, or number of operations (e.g., multiply accumulate operations (MACs)). As such, the artificial neural network (e.g., 520) may be configured differently to run on different computing systems with different types of processors (e.g., CPU, GPU, DSP, NPU, etc.). In one example, such configuration of the network may be determined using the cost function for updating the rank selection parameters $\beta_1$ (and in turn determining whether to turn corresponding filters on or off) which may be defined as follows:

$$\mathcal{L} = \mathcal{L}_{error} + \lambda_o \|w\|^2 + \lambda_3 \sum_{l=1}^{M} \sum_{i=1}^{N_l} C_l \tilde{\beta}_{l,i}, \tag{5}$$

$$\mathcal{L}_{error} = \underset{\theta, \beta_{l,i}, \alpha_l : \forall i,l}{\mathrm{argmin}}\, \ell(\hat{y}(w, \hat{\beta}, \hat{\alpha}), y) \tag{6}$$

where $C_l = \max\{t_{compute}, t_{memory}\}$, $\lambda_3$ is a width limiting regularization factor, $\lambda_o$ is a weight and bias regularization factor, $w$ is a weight term applied to the selectable filter (e.g., 522a), $\hat{\alpha}$ is the computed activation, $\hat{y}$ is the computed output and $y$ is the determined output (e.g., inference or classification).

At a stage C, after fine-tuning the artificial neural network 520, the selectable filters 522a, 522b, and 522c may be removed to produce artificial neural network 540. The artificial neural network 540 may have a reduced model size than artificial neural network 500. For example, convolutional layer conv1 of artificial neural network 540 may be operated with 67 parameters compared to 128 parameters used in conv1 of artificial neural network 500. Similarly, conv2 of artificial neural network 540 may be operated with 131 parameters compared to 256 parameters used in conv2 of artificial neural network 500. Additionally, fully connected layer fc3 of artificial neural network 540 may be operated with 25 parameters compared to 4096 parameters used in fully connected layer fc3 of artificial neural network 500. Accordingly, the artificial neural network 540 may be operated to compute an inference with reduced computations thereby reducing the time to compute an inference (e.g., classification).

Figure 6:
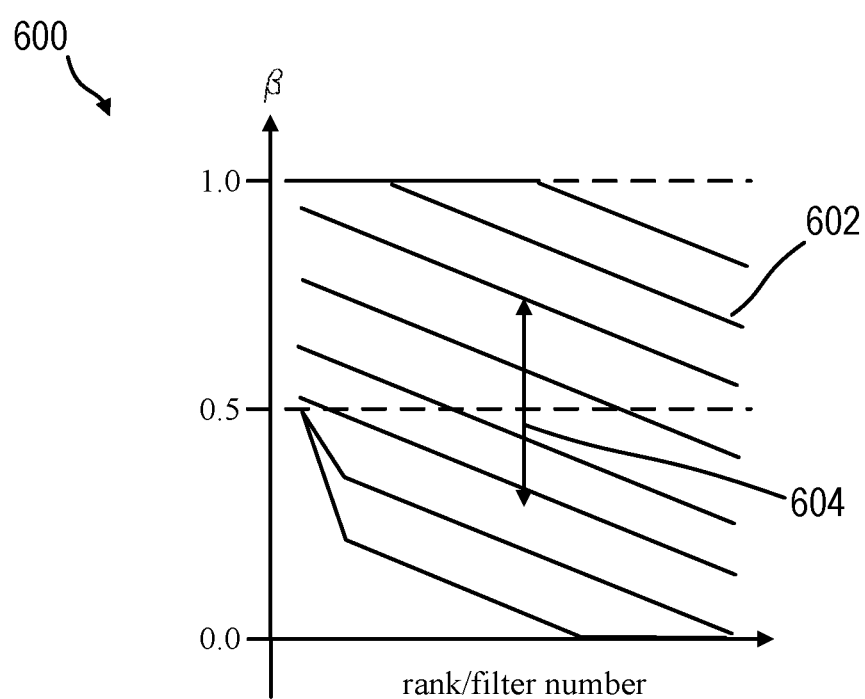
FIG. 6 is a graph illustrating the rank selection parameter relative to the rank/filter number in accordance with aspects of the present disclosure.

FIG. 6 is a graph illustrating the rank selection parameter relative to the rank/filter number. As shown in graph 600, the rank selection parameter $\beta_i$ may vary linearly with respect to the rank number. In some aspects, the rank selection parameter $\beta_i$ for each layer may be initialized to a linear function of the rank number value between 0.5 and 1. As the rank or filter number increases, the value of the rank selection parameter may decrease (e.g., monotonically). Each point on a line (e.g., 602) may represent a rank selection parameter of a selectable filter. When the rank selection parameter $\beta_i$ is updated, a derivate may be computed for each point on the line (e.g., 602). The derivatives may be averaged and the average may be applied to each of the points. As such, the rank selection parameters may move up or down as indicated by arrow 604 in concert. Accordingly, when applied to weight tensors of a layer to which SVD has been applied (e.g., weights 442 of FIG. 4B), the lowest singular values (e.g., element 432 of FIG. 4B) may be removed.

Figure 7:
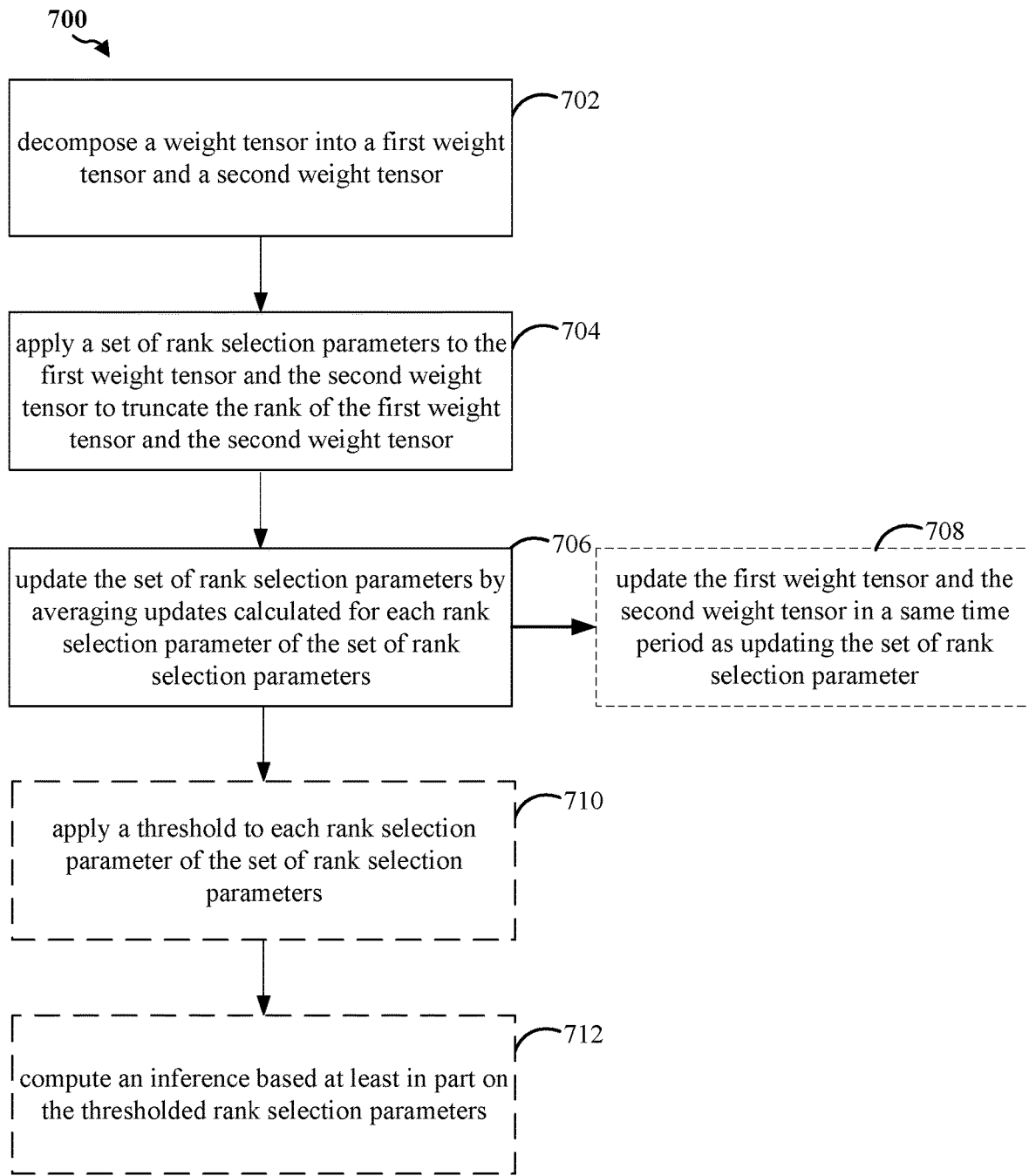
FIG. 7 illustrates a method for learning a rank of an artificial neural network according to aspects of the present disclosure.

FIG. 7 illustrates a method 700 for learning a rank of an artificial neural network. In block 702, the process decomposes a weight tensor into a first weight tensor and a second weight tensor. In some aspects, the weight tensor may be decomposed by applying singular value decomposition to the weight tensor. In block 704, a set of rank selection parameters may be applied to the first weight tensor and the second weight tensor to truncate the rank of the first weight tensor and the second weight tensor. In some aspects, the rank selection parameters may be initialized to a random value, for example.

Furthermore, in block 706, the set of rank selection parameters may be updated by averaging updates calculated for each rank selection parameter of the set of rank selection parameters. In some aspects, the set of rank selection parameters may be updated by performing back propagation using the actual value of the rank selection parameters $\hat{\beta}_i$. The actual value of each of the rank selection parameters may comprise a real number. A gradient may be determined for each of the rank selection parameters. An average of the gradients for all of the rank selection parameters may be determined. The average may be applied to each rank selection parameters.

In block 708, the rank selection parameters may optionally be updated simultaneously (e.g., in the same time period) or concurrently with updating the first weight tensor and the second weight tensor. For example, as discussed above with respect to FIG. 5, because standard back propagation may be used to update the rank selection parameters $\beta_i$, learning the rank selection parameters $\beta_i$ may be combined with fine-tuning or updating the weights of each layer of the artificial network 520 to achieve smaller models.

In block 710, a threshold may optionally be applied to each rank selection parameter of the set of rank selection parameters during computation of an inference. In one exemplary aspect, the threshold may be applied to a rank selection parameter such that the applied value of the rank selection parameter is set to 1 if an actual value of the rank selection parameter $\hat{\beta}_i$ is greater than or equal to the threshold (e.g., 0.5). On the other hand, the applied value of the rank selection parameter set to 0 if the actual value of the rank selection parameter $\hat{\beta}_i$ is less than the threshold.

Furthermore, in block 712, an inference may be optionally computed based at least in part on the thresholded rank selection parameters. For example, as shown in FIG. 4B-C, having applied the rank selection parameters $\beta_i$, the activations for the lowest singular values are removed and the activations for the highest singular values are used to compute an output for which may be used as an input for Layer_B. Such operations may be performed in subsequent layers to compute an inference in an output layer (e.g., fc4 of FIG. 5).

In one configuration, a machine learning model is configured for decomposing a weight tensor into a first weight tensor and a second weight tensor. The model is also configured for applying a set of rank selection parameters to the first weight tensor and the second weight tensor to truncate the rank of the first weight tensor and the second weight tensor. The model is further configured for updating the set of rank selection parameters by averaging updates calculated for each rank selection parameter of the set of rank selection parameters. The model includes a decomposing means, applying means, and/or updating means. In one aspect, the decomposing means, applying means, and/or updating means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

In some aspects, method 700 may be performed by the SOC 100 (FIG. 1) or the system 200 (FIG. 2). That is, each of the elements of method 700 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The blocks of a method or algorithm described in connection with the present disclosure may be embodied directly in hardware, in a software component executed by a processor, or in a combination of the two. A software component may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software component may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more operations or actions for achieving the described method. The method operations and/or actions may be interchanged with one another without departing from the scope of the claims. In other words, unless a specific order of operations or actions is specified, the order and/or use of specific operations and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, the components may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software components. The software components include instructions that, when executed by the processor, cause the processing system to perform various functions. The software components may include a transmission component and a receiving component. Each software component may reside in a single storage device or be distributed across multiple storage devices. By way of example, a software component may be loaded into RAM from a hard drive when a triggering event occurs. During execution of a software component, the processor may load some of the instructions into cache to increase access speed. One or more cache lines may then be loaded into a general register file for execution by the processor. When referring to the functionality of a software component below, it will be understood that such functionality is implemented by the processor when executing instructions from that software component. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of learning a rank of an artificial neural network, comprising:
   decomposing a weight tensor into a first weight tensor and a second weight tensor, the weight tensor comprising a plurality of weights upon which activations of artificial neurons of the artificial neural network are dependent;
   applying a set of rank selection parameters to the first weight tensor and the second weight tensor to truncate the rank of the first weight tensor and the second weight tensor, the set of rank selection parameters being initialized to be monotonically decreasing in order of singular value magnitude; and
   updating the set of rank selection parameters by averaging updates calculated for each rank selection parameter of the set of rank selection parameters.

2. The method of claim 1 wherein the decomposing comprises applying singular value decomposition to the weight tensor.

3. The method of claim 1, wherein each rank selection parameter of the set of ranks selection parameters is initialized to a random value.

4. The method of claim 1, further comprising applying a threshold to each rank selection parameter of the set of rank selection parameters during computation of an inference.

5. The method of claim 4, wherein the threshold is applied to a rank selection parameter such that applied value of the rank selection parameter is set to 1 if an actual value of the rank selection parameter is greater than or equal to the threshold or the applied value of the rank selection parameter set to 0 if the actual value of the rank selection parameter is less than the threshold.

6. The method of claim 1, wherein the updating comprises performing back propagation to determine an error for each of the rank selection parameters of the set of rank selection parameters based on an actual value of the rank selection parameters, the actual value comprising a real number.

7. The method of claim 1, wherein the rank selection parameters are updated simultaneously with the first the first weight tensor and the second weight tensor.

8. The method of claim 1, wherein the truncation of the rank of the first weight tensor and the second weight tensor is configured to reduce consumption of computational resources by the artificial neural network.

9. An apparatus of learning a rank of an artificial neural network, comprising:
   a memory; and
   at least one processor coupled to the memory, the at least one processor being configured to:
      decompose a weight tensor into a first weight tensor and a second weight tensor, the weight tensor comprising a plurality of weights upon which activations of artificial neurons of the artificial neural network are dependent;
      apply a set of rank selection parameters to the first weight tensor and the second weight tensor to truncate the rank of the first weight tensor and the second weight tensor, the set of rank selection parameters being initialized to be monotonically decreasing in order of singular value magnitude; and
      update the set of rank selection parameters by averaging updates calculated for each rank selection parameter of the set of rank selection parameters.

10. The apparatus of claim 9, wherein the at least one processor is further configured to apply singular value decomposition to the weight tensor.

11. The apparatus of claim 9, wherein each rank selection parameter of the set of ranks selection parameters is initialized to a random value.

12. The apparatus of claim 9, wherein the at least one processor is further configured to apply a threshold to each rank selection parameter of the set of rank selection parameters during computation of an inference.

13. The apparatus of claim 12, wherein the threshold is applied to a rank selection parameter such that applied value of the rank selection parameter is set to 1 if an actual value of the rank selection parameter is greater than or equal to the threshold or the applied value of the rank selection parameter set to 0 if the actual value of the rank selection parameter is less than the threshold.

14. The apparatus of claim 9, wherein the at least one processor is further configured to perform back propagation to determine an error for each of the rank selection parameters of the set of rank selection parameters based on an actual value of the rank selection parameters, the actual value comprising a real number.

15. The apparatus of claim 9, wherein the rank selection parameters are updated simultaneously with the first the first weight tensor and the second weight tensor.

16. An apparatus for operating an artificial neural network, comprising:

means for decomposing a weight tensor into a first weight tensor and a second weight tensor, the weight tensor comprising a plurality of weights upon which activations of artificial neurons of the artificial neural network are dependent;

means for applying a set of rank selection parameters to the first weight tensor and the second weight tensor to truncate the rank of the first weight tensor and the second weight tensor, the set of rank selection parameters being initialized to be monotonically decreasing in order of singular value magnitude; and means for updating the set of rank selection parameters, the set of rank selection parameters being updated based on updates calculated for each rank selection parameter.

17. The apparatus of claim 16, further comprising means for applying singular value decomposition to the weight tensor.

18. The apparatus of claim 16, wherein each rank selection parameter of the set of ranks selection parameters is initialized to a random value.

19. The apparatus of claim 16, further comprising means for applying a threshold to each rank selection parameter of the set of rank selection parameters during computation of an inference.

20. The apparatus of claim 19, wherein the threshold is applied to a rank selection parameter such that applied value of the rank selection parameter is set to 1 if an actual value of the rank selection parameter is greater than or equal to the threshold or the applied value of the rank selection parameter set to 0 if the actual value of the rank selection parameter is less than the threshold.

21. The apparatus of claim 16, further comprising means for performing back propagation to determine an error for each of the rank selection parameters of the set of rank selection parameters based on an actual value of the rank selection parameters, the actual value comprising a real number.

22. The apparatus of claim 16, wherein the rank selection parameters are updated simultaneously with the first weight tensor and the second weight tensor.

23. A non-transitory, computer-readable medium storing executable code for learning a rank of an artificial neural network, comprising code to:

decompose a weight tensor into a first weight tensor and a second weight tensor, the weight tensor comprising a plurality of weights upon which activations of artificial neurons of the artificial neural network are dependent;

apply a set of rank selection parameters to the first weight tensor and the second weight tensor to truncate the rank of the first weight tensor and the second weight tensor, the set of rank selection parameters being initialized to be monotonically decreasing in order of singular value magnitude; and update the set of rank selection parameters by averaging updates calculated for each rank selection parameter of the set of rank selection parameters.

24. The computer-readable medium of claim 23, further comprising code to apply singular value decomposition to the weight tensor.

25. The computer-readable medium of claim 23, wherein each rank selection parameter of the set of ranks selection parameters is initialized to a random value.

26. The computer-readable medium of claim 23, further comprising code to apply a threshold to each rank selection parameter of the set of rank selection parameters during computation of an inference.

27. The computer-readable medium of claim 26, wherein the threshold is applied to a rank selection parameter such that applied value of the rank selection parameter is set to 1 if an actual value of the rank selection parameter is greater than or equal to the threshold or the applied value of the rank selection parameter set to 0 if the actual value of the rank selection parameter is less than the threshold.

28. The computer-readable medium of claim 23, further comprising code to perform back propagation to determine an error for each of the rank selection parameters of the set of rank selection parameters based on an actual value of the rank selection parameters, the actual value comprising a real number.

29. The computer-readable medium of claim 23, wherein the rank selection parameters are updated simultaneously with the first the first weight tensor and the second weight tensor.

* * * * *